US008225373B2

(12) United States Patent
Kraemer

(10) Patent No.: US 8,225,373 B2
(45) Date of Patent: *Jul. 17, 2012

(54) PROTECTION OF COMPUTER RESOURCES

(75) Inventor: Jeffrey A. Kraemer, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/895,485

(22) Filed: Sep. 30, 2010

(65) Prior Publication Data

US 2011/0023084 A1    Jan. 27, 2011

Related U.S. Application Data

(63) Continuation of application No. 11/546,650, filed on Oct. 11, 2006, now Pat. No. 7,832,008.

(51) Int. Cl.
*G06F 17/00* (2006.01)
*G06F 11/00* (2006.01)
*G06F 17/30* (2006.01)
*G06F 15/173* (2006.01)
*G06F 12/14* (2006.01)
*G06F 9/46* (2006.01)
*H04L 9/00* (2006.01)
*H04L 12/26* (2006.01)

(52) U.S. Cl. ................. 726/1; 726/22; 726/23; 726/26; 709/223; 709/224

(58) Field of Classification Search ................ 726/1, 22, 726/23, 26; 709/223, 224
See application file for complete search history.

(56) References Cited

U.S. PATENT DOCUMENTS 6,321,338 B1    11/2001    Porras et al.
(Continued)

FOREIGN PATENT DOCUMENTS

WO    WO 2004051929 A1 *    6/2004

OTHER PUBLICATIONS

Peng Ning, Sushil Jajodia, Xiaoyang Sean Wang; "Abstraction-based intrusion detection in distributed environments"; Nov. 2001; Transactions on Information and System Security (TISSEC), vol. 4 Issue 4; Publisher: ACM; pp. 407-452.*

(Continued)

*Primary Examiner* — Eleni Shiferaw
*Assistant Examiner* — Courtney Fields
(74) *Attorney, Agent, or Firm* — Hickman Palermo Truong Becker Bingham Wong LLP

(57) ABSTRACT

In one embodiment, local software code present in a computer system enables real-time detection of whether the computer system is properly protected against malicious attacks from harmful software. For example, software code such as one or more agents executing in the computer system support real-time protection validation based upon detection of the behavior of the computer system (as opposed to mere detection of the presence of resources or applications in the computer system). In response to detecting that the computer system or an application accesses or provides a particular type of resource and should be protected via one or more appropriate protection policies, if the computer system is not already protected, an agent of the computer system can provide immediate remediation (e.g., a security measure) to temporarily protect the computer system until the appropriate protection policy can be activated to protect the computer system against malicious software threats.

15 Claims, 7 Drawing Sheets

U.S. PATENT DOCUMENTS

| | | |
|---|---|---|
| 6,542,993 B1 | 4/2003 | Erfani |
| 6,601,048 B1 | 7/2003 | Gavan et al. |
| 6,910,135 B1 | 6/2005 | Grainger |
| 6,963,983 B2 | 11/2005 | Munson et al. |
| 7,203,962 B1 | 4/2007 | Moran |
| 7,237,267 B2 | 6/2007 | Rayes et al. |
| 7,448,084 B1 | 11/2008 | Apap et al. |
| 7,546,629 B2 | 6/2009 | Albert et al. |
| 7,565,426 B2 | 7/2009 | Jones et al. |
| 7,715,315 B1 | 5/2010 | Ferguson et al. |
| 7,832,008 B1 * | 11/2010 | Kraemer ................. 726/22 |
| 2002/0078049 A1 | 6/2002 | Samar |
| 2002/0078381 A1 | 6/2002 | Farley et al. |
| 2002/0083343 A1 | 6/2002 | Crosbie et al. |
| 2002/0166063 A1 | 11/2002 | Lachman et al. |
| 2004/0205474 A1 | 10/2004 | Eskin et al. |
| 2006/0021035 A1 | 1/2006 | Conti et al. |
| 2006/0041936 A1 | 2/2006 | Anderson et al. |
| 2006/0070118 A1 | 3/2006 | Munson et al. |
| 2010/0082513 A1 | 4/2010 | Liu |
| 2010/0242111 A1 | 9/2010 | Kraemer et al. |

OTHER PUBLICATIONS

Klaus Julisch, "Using Root Cause Analysis to Handle Intrusion Detection Alarms", PhD Thesis, University of Dortmund, Germany (2003). 148 pages.

Seleznyov et al, "HIDSUR: A Hybrid Intrusion Detection System Based on Real-time User Recognition," pp. 41-45, IEEE, 2000.

Jones et al, "Computer System Intrusion Detection: A Survey," Feb. 2000, University of Virginia. 25 pages.

English translation of: State Intellectual Property Office of the Peoples Republic of China Office Action Chinese Patent Application No. 200680000999.3, issue date: Dec. 19, 2008. 10 pages.

* cited by examiner

PROTECTION OF COMPUTER RESOURCES

CROSS-REFERENCE TO RELATED APPLICATIONS; PRIORITY CLAIM

This application claims benefit as a Continuation of application Ser. No. 11/546,650, entitled "Protection of Computer Resources," by Jeffrey A. Kraemer, filed Oct. 11, 2006 now U.S. Pat. No. 7,832,008, the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).]

BACKGROUND

Computer systems, networks and data centers are constantly exposed to a variety of attacks that may compromise the security and/or operation of the system. Examples include various forms of malicious software program attacks such as viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Virus attacks, worm attacks, and Trojan horse attacks are variants of each other that generally involve the execution of a program, for which a user often is unaware of its existence, that performs some undesired processing operations to comprise a computer's proper operation.

Other malicious programs operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computers to silently obtain otherwise confidential information such as usernames and passwords required to access protected data, lists, contents of files or even a remote web site's user account information.

Computer system developers, software developers and security experts have produced many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, which a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include denial-of-service attacks, buffer overflow operations, execution of malformed application data, and execution of malicious mobile code. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of service attacks may also seek to crash the targeted machine, rather than simply consume resources. Buffer overflow attacks occur when programs do not provide appropriate checks of data stored in internal data structures within the software that result in overwriting of surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks or allowing data stream parsing errors.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

Computer security products typically provide application or resource specific protections. The Cisco Security Agent (i.e., CSA) is one such solution in which access control rules are grouped and deployed as "security policies." Implementation of these policies provides specific protections to applications. For example, one policy may control the behavior of an email client; another policy may protect behavior associated with a Web Server, and so on.

For security reasons, performance concerns, and complexity of managing policies, each of every possible existing policy is not deployed to every agent running on a respective computer system to protect it. Such policies are applied on an as needed basis. That is, if a computer system is configured to be a web server, a respective agent on the computer system runs a web server policy to protect it. If a respective computer system supports personal use by an assigned user and supports e-mail management functions, the respective agent on the computer system runs an e-mail policy to protect it. A computer system supporting personal use by the assigned user would not be configured to with an agent that executes a web server policy because such a policy would not be applicable to the computer system.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION OF EXAMPLE EMBODIMENTS

Overview

Figure 1:
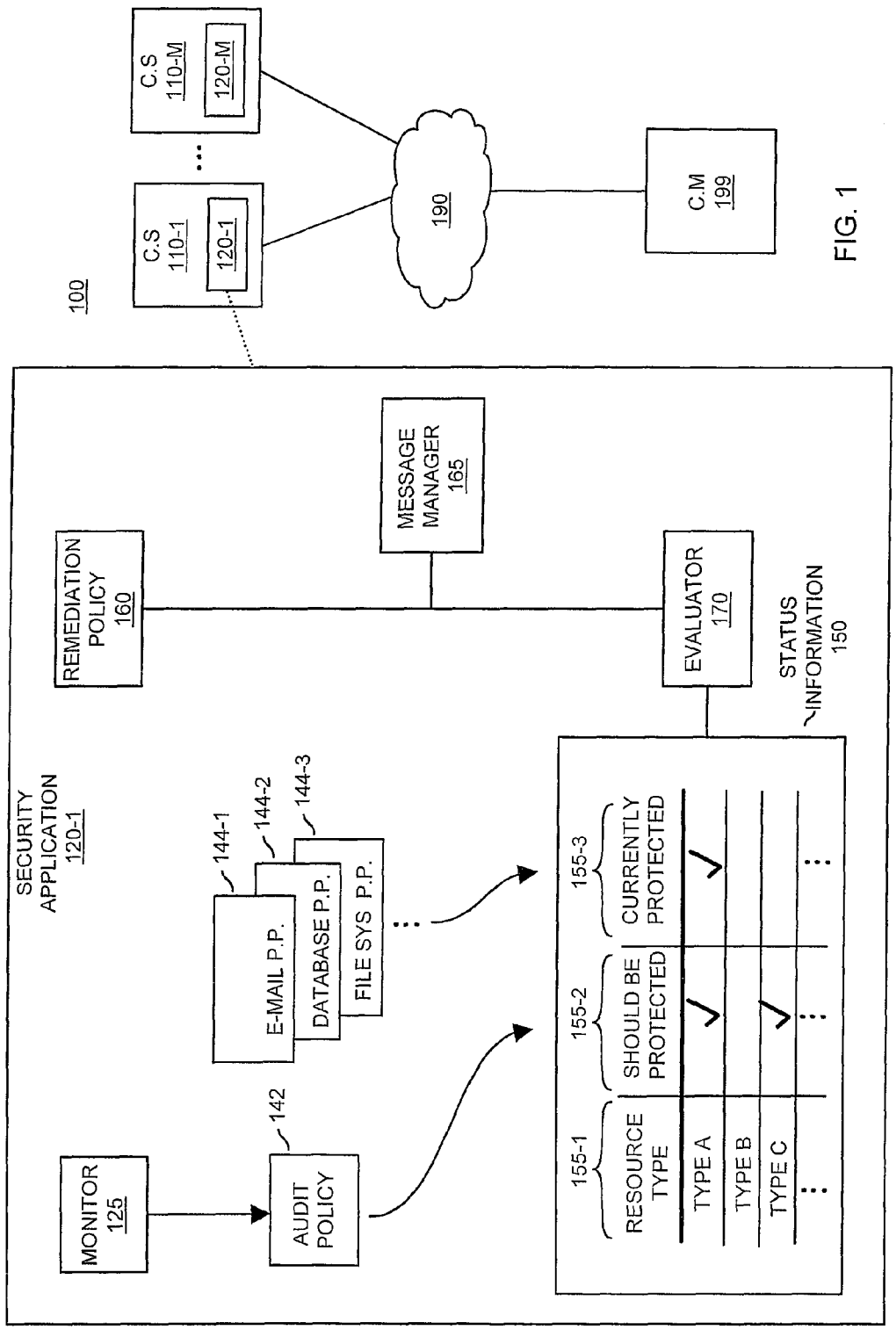
FIG. 1 is a diagram illustrating an example technique for protecting a computer environment according to embodiments herein.

In a specific embodiment as discussed in more detail below in this detailed description, software code in a respective computer system performs real-time validation of protection policies to ensure that a respective computer system, no matter what software is thought to be installed and running on the computer system, is properly protected. The software code supports real-time validation of protection policies based upon detection of the behavior of the computer system (as opposed to detected resources in the computer system). In other words, execution of the software code enables monitoring occurrence of events (e.g., a behavior, actions, reactions, etc.) associated with the computer system. In response to detecting occurrence of a given event in the computer system or that the computer system (or application) exhibits a certain behavior or accesses a particular type of resource, the software code initiates execution of (e.g., fires) an audit rule associated with the given event to provide notification (e.g., a flag) that a corresponding protection policy associated with the given event should be currently operating to protect the computer system. The software code further evaluates whether the corresponding protection policy is currently operating in the computer system. In response to identifying that the corresponding protection policy should be but is not currently operating or present in the computer system, the software code initiates application of a security measure (e.g., immediate remediation) to protect the computer system. This notification can vary as will be discussed in more detail below.

DETAILED DESCRIPTION

Conventional methods for implementing protection policies on computer systems suffer from a number of deficiencies. For example, in a large organization, there are typically many different types of applications deployed in each of the member computer systems. Accordingly, there are many different types of resource specific protection policies that can be implemented to protect the different types of computer systems in the organization. Correct types of security or protection policies should be deployed in a respective computer system in order to provide proper protection. According to conventional methods, this requires that an administrator (who presumably knows which policies should be deployed to protect which applications) know each application running on respective computer systems in the organization. In many cases, employees can install applications unbeknownst to the administrator.

If an administrator does not know which computer systems run which applications, a critical resource in a computer system can be left unprotected. In such an instance, the computer system could be vulnerable to a malicious attack. As an example, if a user were to install a web server on his computer system without initiating a respective protection policy to protect the server, the host might be susceptible to the Code Red worm. An administrator of the computer environment may not learn of the server deployment and implement a corresponding protection policy until it is too late such as after considerable damage has been incurred by the deployment.

Techniques discussed herein deviate with respect to conventional applications such as those discussed above as well as other techniques known in the prior art. For example, the present disclosure includes novel techniques for protecting one or more computer systems from malicious software attacks. Note that some but not all of the following embodiments of the present disclosure provide a solution for the abovementioned deficiencies.

According to one embodiment, local software code executed in a computer system enables real-time detection of whether the computer system is properly protected against possible malicious attacks from known and unknown types of harmful software. For example, software code and/or hardware such as one or more agents executing in the computer system support real-time protection policy validation based upon detection of the specific behavior of the computer system (as opposed to mere detection of the presence of resources or applications residing on the computer system). In response to detecting that the computer system behaves like a particular type of resource (e.g., a web server) and should be protected via one or more appropriate protection policies, if the computer system is not already protected, a security application in the computer system provides immediate remediation (e.g., a security measure such as a lockdown function) to temporarily protect the computer system until the appropriate protection policy can be activated to protect the computer system against malicious software threats. In one embodiment, the security application provides notification to an administrator that the computer system is not properly protected.

Application of this real-time, self-validation technique and initiation of immediate remedial measures by the computer system provides an additional layer of protection not afforded by conventional techniques. For example, in the event that a computer administrator of an organization is unable to prevent users from executing new applications in computer systems before being able to apply appropriate protection policies in a respective computer system, the security resource executing in the respective computer system protects the computer system against possible harm. Accordingly, apparatus and techniques herein enable detection of unprotected applications or resources in real-time and, when appropriate, immediate application of an administratively specified containment policies until full remediation can occur.

It is to be understood that aspects of the disclosure herein can be embodied strictly as a software program resource, as a combination of software and hardware resources, or as a hardware resource alone, such as those residing in a computer system or data communications device. As an example, the techniques as explained herein can be employed in computer systems and/or software systems such as those manufactured by Cisco Systems, Inc. of San Jose, Calif.

FIG. 1 is a block diagram of an example computer environment 100 including computer system 110-1, . . . , computer system 110-M (collectively, computer systems 110), network 190, and central manager 199 according to an embodiment herein. As shown, computer system 110-1 includes security application 120-1. Security application 120-1 (e.g., including one or more software agents implementing a real-time security validation application) includes monitor 125, audit policy 142, protection policies 144 (e.g., protection policy 144-1, protection policy 144-2, protection policy 144-3, etc.), remediation policy 160, message manager 165, evaluator 170, and status information 150. Status information 150 includes columns of information including column 155-1 (e.g., data fields of resource type information), column 155-2 (e.g., data fields indicating whether a respective resource should be protected), and column 155-3 (e.g., data fields indicating whether a respective is currently protected).

In the context of one embodiment, network 190 is a packet-switched network (e.g., the Internet, private local area network, wide area network, etc.) connecting multiple computer systems 110 (e.g., personal computers) operated by different users. As discussed above, a network administrator overseeing computer environment 100 cannot always control users and, more specifically, which applications are currently implemented on computer systems 110 (whether they be implemented for devious purposes or not). Accordingly, each of computer systems 110 including computer system 110-1 can include a corresponding security application 120-1 that performs a self-evaluation security function to protect against potentially malicious software such as computer viruses, Trojan hoses, worms, and other sorts of so-called malware.

As well known, a computer virus is a self-replicating computer program that spreads by inserting copies of itself into other executable code or documents. A computer virus behaves in a way similar to a biological virus, which spreads by inserting itself into living cells. Extending the analogy to computers, the spreading of a virus into a program of computer system 120-1 (e.g., host) is termed as an "infection". Technically, viruses are one of several types of malicious software or mal ware.

A Trojan horse is another type of malware. Such a program appears on its face to do one thing (like claim to be a picture) but actually does damage when one starts it (it can completely erase one's files). Trojan horses generally do not replicate automatically.

A worm is another type of malware (e.g., a piece of software) that uses computer networks and security flaws to create copies of itself. A copy of the worm will scan the network for any other machine that has a specific security flaw. It replicates itself to the new machine using the security flaw, and then begins scanning and replicating anew.

An e-mail virus is another type of mal ware that uses e-mail messaging as a mode of transport. It usually will copy itself by automatically mailing itself to hundreds of people in a victim's address book.

While so-called malware can be intentionally destructive, for example, by destroying data, many other types of viruses are fairly benign or merely annoying. Some viruses have a delayed payload, which is sometimes called a bomb. Initially, a virus might display a message on a specific day or wait until it has infected a certain number of hosts. A time bomb occurs during a particular date or time, and a logic bomb occurs when the user of a computer takes an action that triggers the bomb.

Typically, the predominant negative effect of viruses (e.g., malware) is their uncontrolled self-reproduction, which wastes or overwhelms computer resources.

In addition to protecting against malware (e.g., viruses, Trojan horses, worms, etc.) as discussed above, note that embodiments herein can provide protection against other types of threats such as spyware, identity theft, adware, etc.

Note further that protection herein (as provided by security application 120-1) need not be limited to malicious or potentially devious software. For example, techniques herein can be extended to cover execution of inherently benign software such as software not authorized for use by a respective computer administrator overseeing computer environment 100. This will become more apparent in the following discussion of how security application 120-1 operates to protect computer system 120-1. Note that each of multiple computer systems 120 can include and operate their own corresponding security application 120-M for protection purposes.

In the context of one embodiment as discussed above, computer system 110-1 runs security application 120-1 that performs real-time validation (and potentially non real-time validation) of whether the computer system 110-1 is properly protected against malware. For example, monitor 125 monitors a behavior (e.g., occurrence of events, activities, inactivity such as non-occurrence of events, etc.) associated with computer system 110-1. Examples of monitoring behavior can be monitoring actions and/or reactions associated with computer system 110-1. This can include monitoring the resources (e.g., input/output ports, communication ports, memory, applications, etc.) themselves and/or monitoring behavior associated with the resources.

Audit policy 142 includes criteria including instructions (e.g., Access Control List type rules) that utilize the information provided by monitor 125 to set status information in column 155-2 whether a respective resource in computer system 110-1 should be protected. For example, monitor 125 may detect that computer system 110-1 receives a request to accept a network connection on TCP (Transmission Control Protocol) port 80. Flagging an appropriate entry provides an indication that computer system 110 is behaving like a server such as a web server that serves web pages. In response to receiving the information that computer system 110-1 behaves like a web server, audit policy 142 initiates marking an entry in column 155-2 with a checkmark to indicate that the computer system 110-1 should be protected with a respective protection policy that protects such types of servers. Note that the above discussion is only an example and that audit policy 142 can be configured to detect whether computer system exhibits behavior associated with other types of servers.

In the context of this example, assume that web servers fall under a class of type C resources. In such an instance, the audit policy 142 would initiate marking (e.g., by setting or resetting a bit) the appropriate "TYPE Coo entry in column 155-2 to indicate that the computer system 110-1 should be protected with a respective protection policy.

In addition to detecting real-time behavior such as that computer system 110 behaves like a web server in some respects, assume that monitor 125 also detects activity such as sending and/or receiving e-mail information. Assume that e-mail is a TYPE A resource. Accordingly, in the present example, audit policy 142 initiates modification of status information 150, specifically an entry in column 155-2 associated with entry TYPE A, to indicate that computer system 110 should be protected with an e-mail protection policy.

In addition to implementing audit policy 142, security application 120-1 also implements one or more policies (e.g., protection policies 144) to protect the computer system 110-1 from software such as mal ware as discussed above. When implemented, each of protection policies 144 includes one or more instructions (e.g., rules) to modify contents of status information 150. For example, when executed or implemented, a respective protection policy 144 sets the appropriate entries in column 155-3 to indicate what type of resource the corresponding protection policy protects in computer system 110-1. In the present example, assume that protection policy 144-1 protects TYPE A resources in computer system 110-1. Accordingly, protection policy 144-1 modifies status information 150 to indicate that resources of TYPE A (e.g., e-mail resources) in computer system 110-1 are protected via presence of protection policy 144-1.

Security application 120-1 executes each of the protection policies 144 and audit policy 142 so that column 155-3 of status information 150 reflects each and every protection policy 144 that is currently protecting corresponding resources in computer system 110-1.

Upon completion of execution or application of protection policies 144, when a resource is accessed or an operation or behavior is observed, evaluator 170 of security application 120-1 identifies which types of resources in computer system 110-1 should be protected but are not protected. As an example, assume that audit policy executes an instructions to set TYPE C entry in column 155-2 to indicate that the TYPE C resource should be protected. Assume further that none of the protection policies 144 modifies a respective entry in column 155-3 to indicate that computer system 110-1 was protected with respect to TYPE C resources. This means that computer system 110-1 may be vulnerable with respect to malware that attacks TYPE C resources. Accordingly, in the context of the present example, evaluator 170 initiates immediate execution of a remediation policy 160 (e.g., a containment policy) to protect computer system 110-1. For example, in one embodiment, enabling of remediation policy 160 would prevent computer system 110-1 to engage in further network connectivity. The appropriate security measure can vary depending on the application. The implementation of remediation policy 160 (e.g., security measures) can be temporary until the computer system 110 is protected via a protection policy 144.

Accordingly, the security application 120-1 can initiate execution of a first type of protection policy to protect the computer system 110-1 against a respective set of computer attacking software known to attack a first type of computer functionality associated with the computer system. Additionally, the security application can initiate execution of a second type of protection policy to protect the computer system against a respective set of computer attacking software known to attack a second type of computer functionality associated with the computer system. For a third type of resource operating or present in the computer system 110-1 that is unprotected, the security application 110-1 can initiate application of a security measure (e.g., a temporary security measure) associated with remediation policy 160 to protect the computer system 110 and/or initiate execution of a third type of protection policy to protect the computer system against a respective set of computer attacking software known to attack a third type of computer functionality associated with the computer system as will be discussed below.

In addition to temporarily enabling remediation policy 160, the evaluator 170 can prompt message manager 165 to communication over network 190 and notify central manager 199 (e.g., an administrator of the computer environment 100) that computer system 110-1 behaves like a server and that security application 120-1 does not offer security with respect to such a resources type. This notification enables the central manager 199 to take appropriate measures to implement (e.g., send, enable, activate, etc.) a respective protection policy in security application 120-1 so that computer system 110-1 is properly protected against malware that attacks TYPE C resources (e.g., servers). Alternatively, the administrator can reconfigure the computer system 110-1 so that the computer system 110-1 no longer behaves like a server, thus eliminating the need to activate or provide a corresponding protection policy in the computer system 110-1.

In one embodiment, the management console (e.g., central manager 199) can aid the administrator in applying the correct policy by providing a listing of appropriate protection policies that can be used to protect resources that are present but not protected in computer system 110-1.

The security application 120-1 can be embodied as a Cisco™ Security Agent (e.g., CSA) in which access control rules are grouped and deployed as protection policies 144 as discussed above. As mentioned, one policy may control the behavior of an email client, whereas another may protect a Web Server, and so on. For security reasons, false positive concerns (where misapplied restrictions may disrupt the proper behavior or function of and application or system), performance concerns, and due to the inherent complexity of managing many policies, every existing type of protection policy should not be deployed on every computer system 110 in computer environment 100. Instead, the protection policies can be applied on an as needed basis.

Note that in a large organization of many computer systems 110 in computer environment 100, there may be many different application or resource specific protection policies. In one embodiment, correct protection or security policies are implemented from the central manager (e.g., central console) whenever appropriate. In such an embodiment, this requires a central administrator know where applications or resources requiring protection are being used. If the administrator does not know this, a critical resource could be left unprotected and possibly vulnerable to a network based attack. For example, if someone were to install a web server on their personal computer, without proper protection, the computer system might be susceptible to the Code Red worm. The embodiments as discussed above reduce or eliminate this problem because the security application 120-1 can operate in real-time to protect against such attacks.

One possible solution to provide protection is to perform periodic (or occasional) audits of software installed on different hosts in computer environment 100 and verify that appropriate security policies are attached for each host from a remote site. However, there are several limitations to this approach. For example, this validation technique is not performed in real-time, is based upon software installation and not behavioral usage, and cannot force remediation. As discussed above, embodiments herein enable real-time, self-validation that a respective computer system 110 is properly protected as well as monitoring of behavior and not just presence of resources or applications. Moreover, embodiments herein enable immediate remediation and messaging to protect the computer system.

In other words, the security application 120-1 continuously repeats a process of executing audit policy 142 and protection policies 144 to evaluate in real-time as events occur whether the computer system 110-1 is properly protected. That is, after evaluating whether a corresponding protection policy is currently operating in the computer system to protect the resource type associated with the given event, the security application 120-1 resets the flags in status information 150. Thereafter, the security application 120-1 repeat steps of: i) setting the flags via execution of the audit policy and protection policies, ii) evaluating a current protection policy implemented in the computer system, and iii) resetting the flag for future detected events to ensure real-time protection of resources in the computer system.

Note that the flagging technique discussed herein can be performed for each detected event (e.g., access request, etc.) to determine a lack of protection using static policies. Additionally, note that the flagging technique herein can be performed periodically or occasionally after logging occurrence of one or more events over time rather than clearing flag results after each detected event. As will be further discussed, note that lack of detection via audit policy 142 as discussed above can be implemented in tables or rules as well.

When so implemented as a continuous routine (e.g., repeatedly executing audit policy 142 and protection policies 144 after clearing of status information on each run, where the rules are repeatedly applied to observed behavior or access of a resource), detection of events or activities by monitor 125 in real-time affords a higher level of protection than conventional methods because a respective remediation policy 160 can be implemented faster than if central manager 199 were to initiate monitoring and remediation. That is, upon detecting a lack of protection, a local security policy can be changed allowing for immediate remediation. As discussed above, remediation can include a "lock down" approach with respect to a non-compliant host or possibly signaling over network 190.

Figure 2:
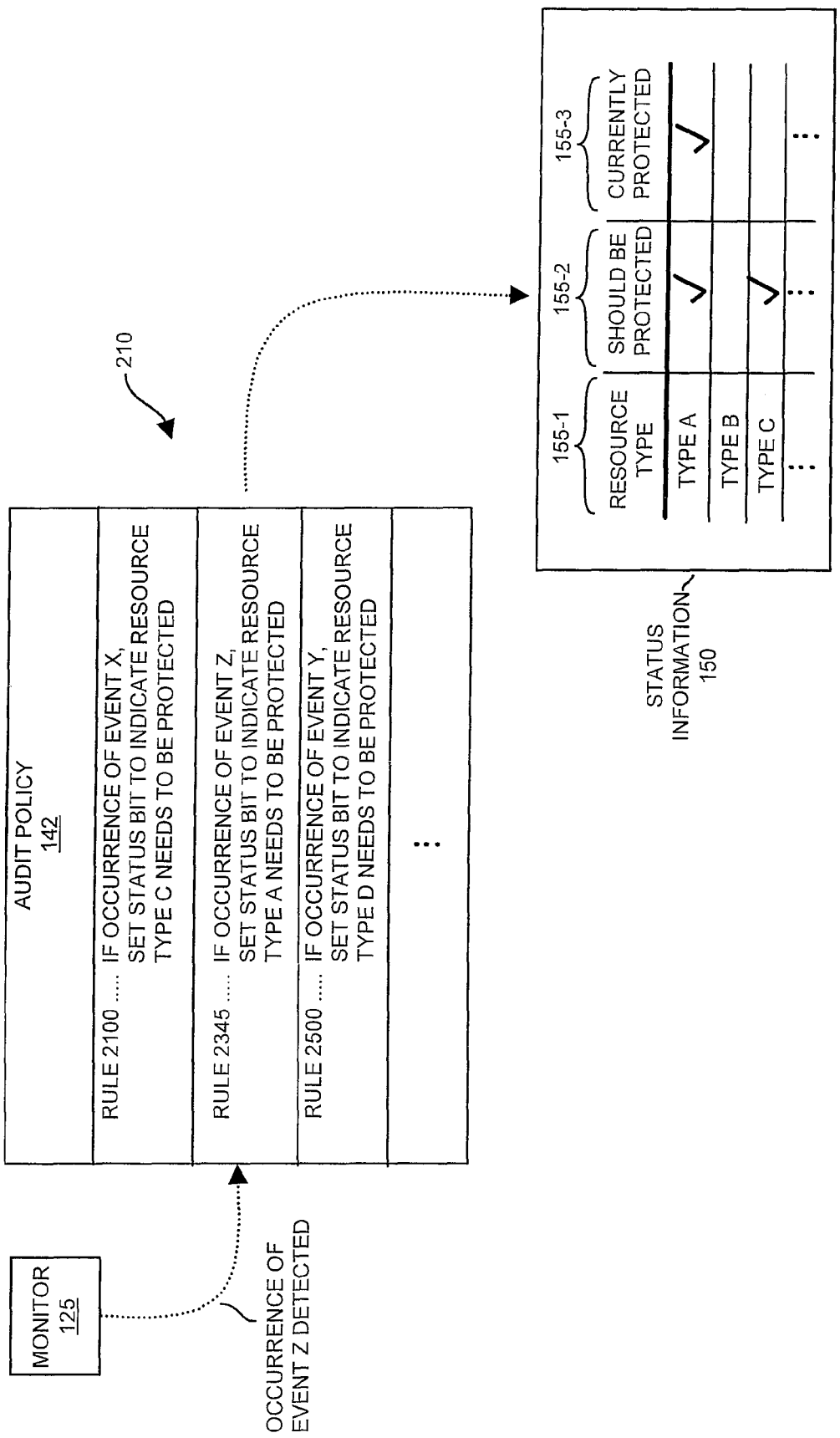
FIG. 2 is a diagram of an example audit policy including instructions for setting status information according to embodiments herein.

FIG. 2 is a diagram illustrating an example makeup and use of an audit policy 142 according to embodiments herein. As shown, monitor 125 provides notification of behavior (e.g., occurrence of event Z) associated with computer system 110-1. In response to detection of such an event, a respective executed rule (e.g., rule 2345) of multiple rules 210 in audit policy 142 initiates modification of an appropriate entry in column 155-2 to indicate that a resource of TYPE A needs to be protected.

Figure 3:
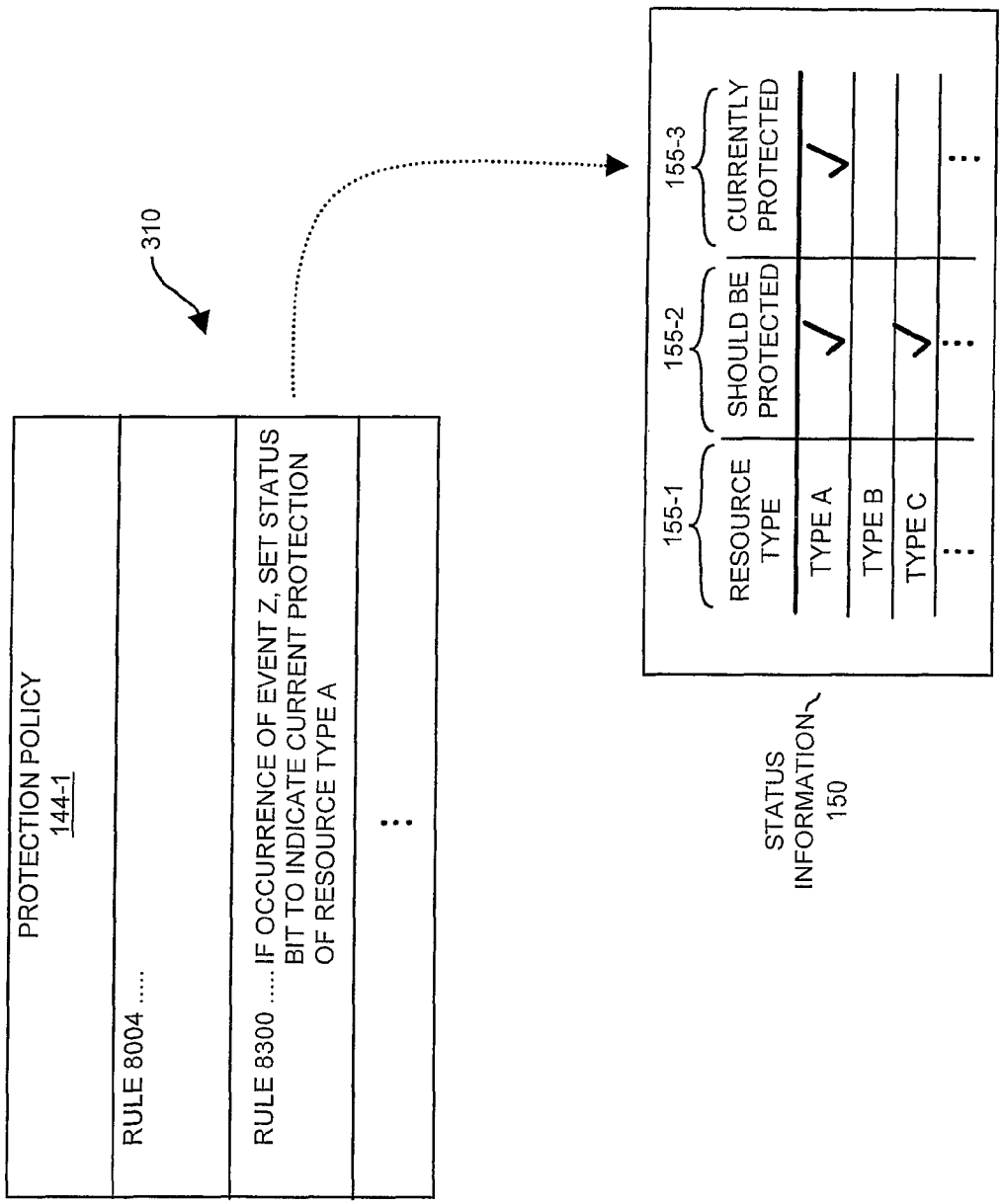
FIG. 3 is a diagram of an example resource protection policy including instructions for setting status information according to embodiments herein.

FIG. 3 is a diagram illustrating an example makeup and use of a respective protection policy 144 (e.g., e-mail protection policy, database protection policy, file system protection policy, etc.) according to embodiments herein. As shown, protection policy 144-1 includes a respective rule (e.g., instruction or set of instructions) of multiple rules 310 that identify which types of resources it protects. For example, when executed, protection policy 144-1 includes rule 8300 that selectively modifies contents (depending on occurrence of an event) of status information 150 to indicate that the respective protection policy 144-1 protects TYPE A resources.

In one embodiment, an administrator can create and distribute audit policies and protection policies. For example, an administrator can configure an ACL(Access Control List)-like rule, where the resulting action (rather than to ALLOW or DENY access to a resource) is to set a named Cisco Security Agent attribute to a specified value (locally on each agent). One such attribute, "detected access," can be set to either "Protected" or "Unprotected" states. As discussed above, setting this attribute (e.g., in status information 150) indicates whether or not this specific resource access is protected or not.

An auditing policy can be specified which contains a list of ACL SET rules that execute when critical resources are accessed or application behavior is detected. These rules specify that the detected access to the resource is unprotected. The audit policy 142 can be applied on many computers in computer environment 100. If a security policy (e.g., one or more of protection policies 144) provides protection for a given resource, a corresponding ACL SET rule would specify that the detected access is protected. Note that one or more protection policies can offer protection with respect to the same type of resource. If the correct policy is applied to a host computer system when a request is made to access a specified resource in the computer system, the resource is recognized as being properly protected.

In one embodiment, the security application 120-1 evaluates every resource request against the applied rules for that particular agent. Multiple SET attribute rules can be applied for a single request. In the presence of multiple matches for the "detected access" attribute, "Protected" takes precedence over "Unprotected" as the resulting value. The net effect of this technique is that a so-called Protected value clears or nullifies an Unprotected value.

If a request is ultimately identified as Unprotected, a security application 120-1 system state is enabled indicating there is an unprotected resource on this agent and an event will be sent to the central manager 199. Additionally, an administratively specified policy (based upon this system state) would go into effect.

As a simple example is as follows:

1. A security policy for web servers can include the rule: "SET detected access as PROTECTED when All applications act as a server for TCP (Transmission Control Protocol)/80"

2. An auditing policy applied to all windows hosts would include the rule: "SET detected access as UNPROTECTED when All applications act as a server for 30 TCP/80"

3. A network lockdown policy applied to all windows hosts would include the rule: "DENY when All applications act as a client or server for all TCP and UDP (User Datagram Protocol)" This policy would be dependent upon the "Unprotected Access" system state being set.

4. At this point, any host which accepts an HTTP (Hypertext Transfer Protocol) connection without the web server policy would be detected as being unprotected. The network lockdown policy would be immediately enabled preventing further network connectivity.

5. After the administrator has applied the desired security policy to this agent (note there may be more than one policy from which the admin could choose), normal operation could continue on the agent.

Note that in other embodiments, the agent (e.g., security application 120-1 or its subscriber-components) could request the central manager 199 (e.g., management console) to apply the appropriate protection policies programmatically such as in real-time, without administrative action being required.

Accordingly, embodiments herein can detect a lack of protection based upon resource access or application activity (and not simply the presence of installed software or other resource). The detection can be encoded in the security policies themselves. This is important in the presence of multiple configurable security policies.

Note that the number of the auditing type rules can be relatively small in comparison to the number of enforcement rules potentially present in each protection policy. For example, a single rule in the audit policy 142 can detect presence of an unprotected web server application in computer system 110-1, whereas a web server protection policy (e.g., one or more of protection policies 144) can contain upwards of 50 or more ACL (Access Control List) type rules.

Figure 4:
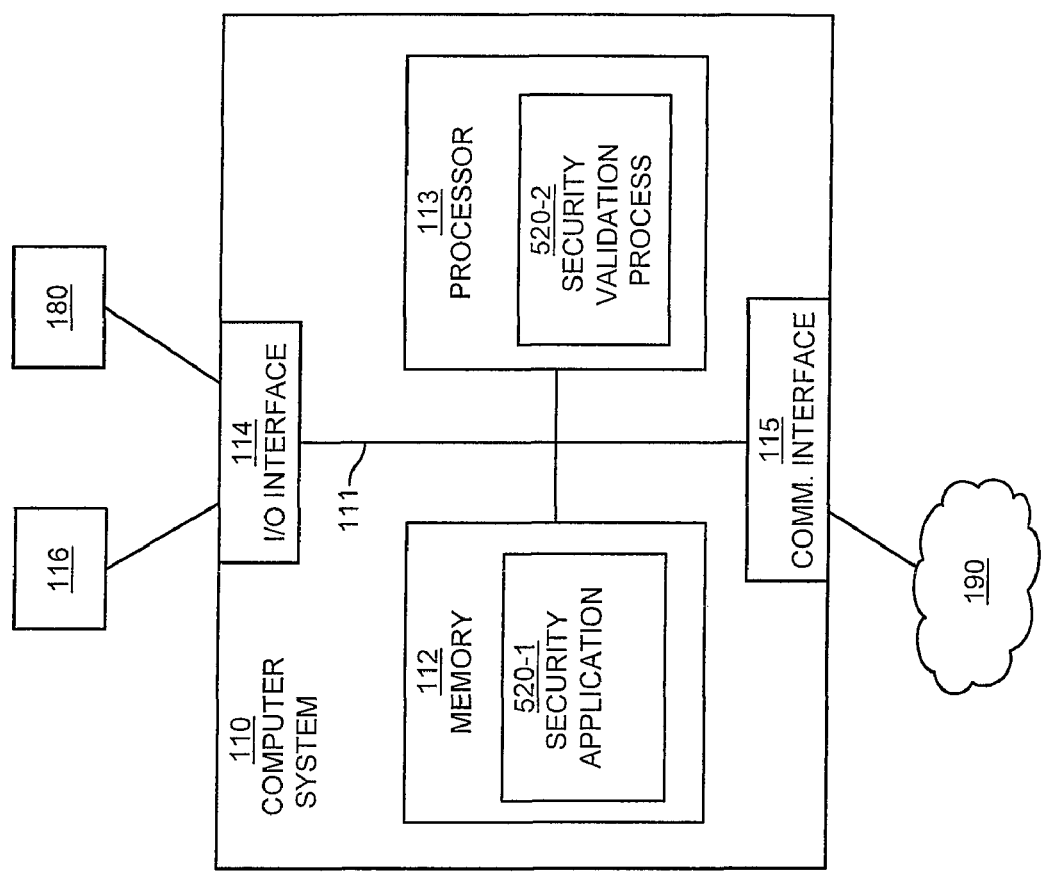
FIG. 4 is a diagram of an example platform for executing a security validation process according to embodiments herein.

FIG. 4 is a block diagram illustrating an example computer system 110-1 for executing security application 120-1 and other related processes according to embodiments herein. Computer system 110-1 can be a computerized device such as a personal computer, workstation, portable computing device, console, processing device, etc.

As shown, computer system 110-1 of the present example includes an interconnect 111 that couples a memory system 112, a processor 113, an I/O interface 114, and a communications interface 115. Peripheral devices 116 (e.g., one or more optional user controlled devices such as a keyboard, mouse, display screens, etc.) can couple to data communication device through I/O interface 114. I/O interface 114 enables computer system 110-1 to access repository 180 and display information on a respective display screen for a user.

Communications interface 115 enables computer system 110-1 to initiate communications over network 190 for purposes of transmitting and receiving information from different resources (e.g., central manager 199 and other computers in network 190).

As shown, memory system 112 is encoded with security application 520-1 (e.g., security application 120-1) protection validation as discussed herein. Security application 520-1 can be embodied as software code such as data and/or logic instructions (e.g., code stored in the memory or on another computer readable medium such as a disk) that support functionality according to different embodiments described herein.

During operation, processor 113 of computer system 110-1 accesses memory system 112 via the interconnect 111 in order to launch, run, execute, interpret or otherwise perform the logic instructions of the security application 520-1. Execution of security application 520-1 produces processing functionality in security validation process 520-2 (Not displayed in the figures). In other words, the security validation process 520-2 represents one or more portions of the security application 520-1 (or the entire application) performing within or upon the processor 113 in the computer system 110-1.

It should be noted that the security application 520-1 (e.g., security application 120-1) as discussed above (and as will be discussed further below) can be executed in an environment such as computer environment 100 or, more specifically, computer system 110-1. Security application 120-1 can be represented by either one or both of the security application 520-1 and/or the security validation process 520-2. For purposes of this discussion and different embodiments herein, general reference will again be made to the security application 120-2 as performing or supporting the various steps and functional operations as previously discussed and as will be discussed further in this specification.

It should be noted that, in addition to the security validation process 520-2, embodiments herein include the security application 120-1 itself (i.e., the un-executed or non-performing logic instructions and/or data). The security application 120-1 and/or security application 520-1 can be stored on a computer readable medium such as a floppy disk, hard disk, or optical medium. The security application 120-1 can also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of security application 120-1 in processor 113 as the security validation process 520-2. Thus, those skilled in the art will understand that the computer system 110-1 can include other processes and/or software and hardware components, such as an operating system that controls allocation and use of hardware resources associated with the computer system 110-1.

Functionality supported by computer system 110-1 such as security application 120-1 will now be discussed in FIGS. 5-7. For purposes of this discussion, computer system 110-1 or, more particularly, security application 120-1 (or related functions) generally perform steps in the flowcharts at runtime. The functionality associated with security application 120-1 can be extended to the other entities as well. Also, note that the steps in the below flowcharts need not always be executed in the order shown.

Figure 5:
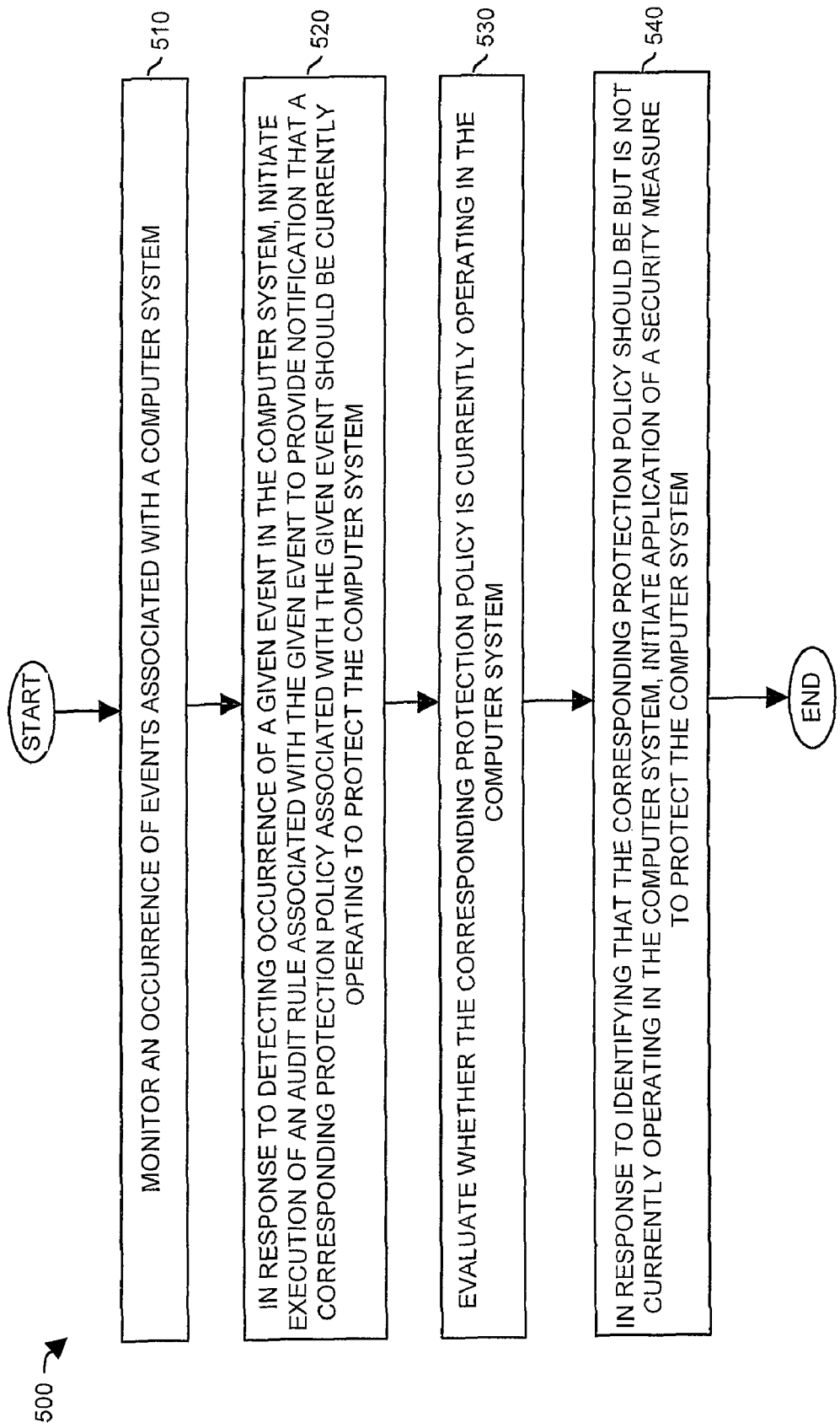
FIG. 5 is a flowchart illustrating example techniques of implementing a security validation process according to embodiments herein.

Now, more particularly, FIG. 5 is a flowchart 500 illustrating an example technique of utilizing security application 120-1 to provide real-time protection validation according to embodiments herein. Note that techniques discussed in flowchart 500 overlap and summarize some of the techniques discussed above.

In step 510, the security application 120-1 deploys monitor 125 to monitor an occurrence of events associated with a computer system 110-1.

In step 520, the security application 120-1 initiates execution of an audit rule associated with a detected event (e.g., behavior) in order to provide notification that a corresponding protection policy associated with the detected event should be currently operating to protect the computer system 110-1.

In step 530, the security application 120-1 deploys evaluator 170 to evaluate whether the corresponding protection policy is currently operating in the computer system to protect computer system 110-1.

In step 540, the security application 120-1 (or evaluator 170) initiates application of a security measure (e.g., remediation policy 160) to immediately protect the computer system 120-1 in response to identifying that the corresponding protection policy should be but is not currently operating in the computer system 110-1.

Figure 6:
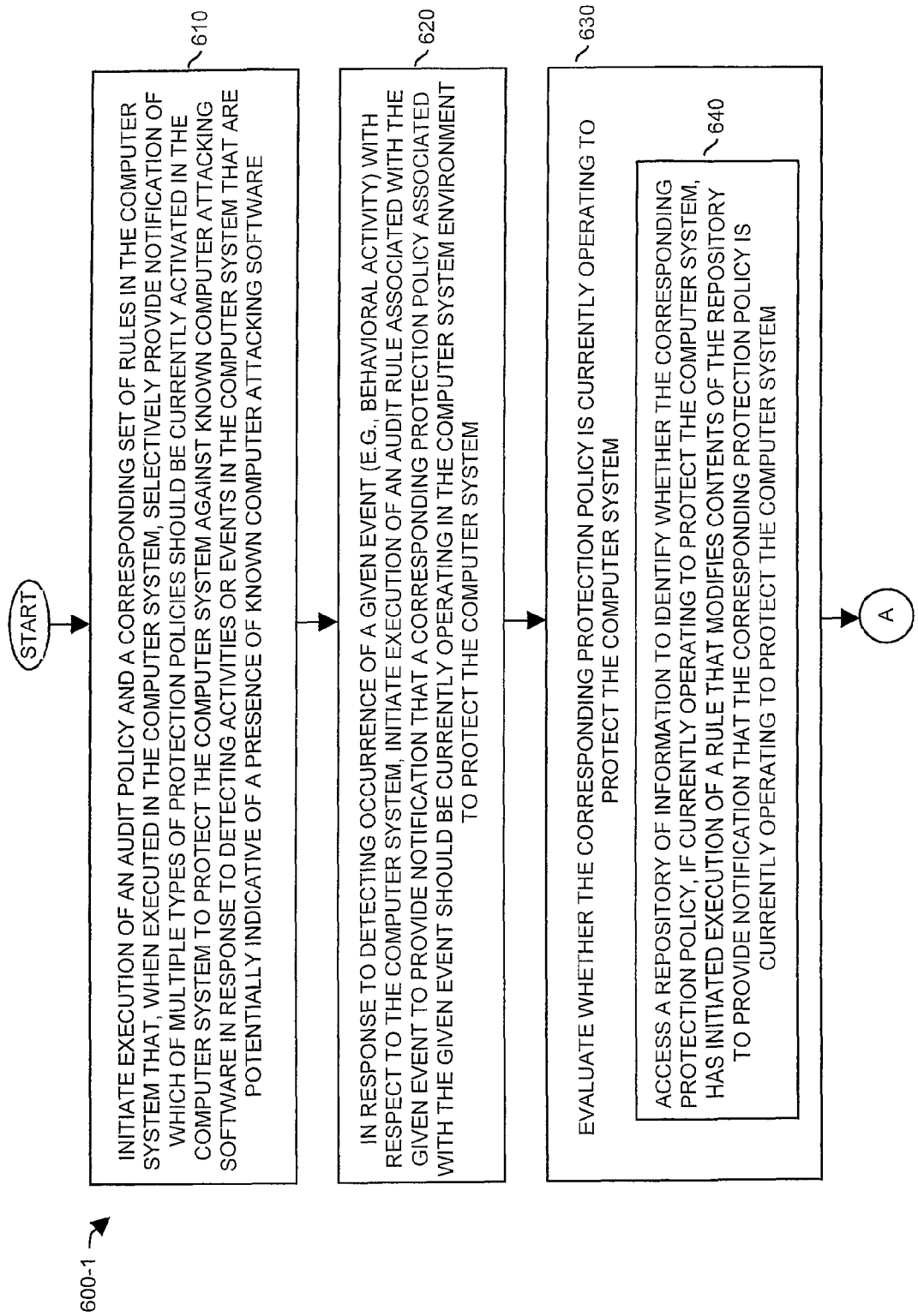
FIGS. 6 and 7 combine to form a more detailed example flowchart illustrating techniques of implementing a security validation process according to embodiments herein.
Figure 7:
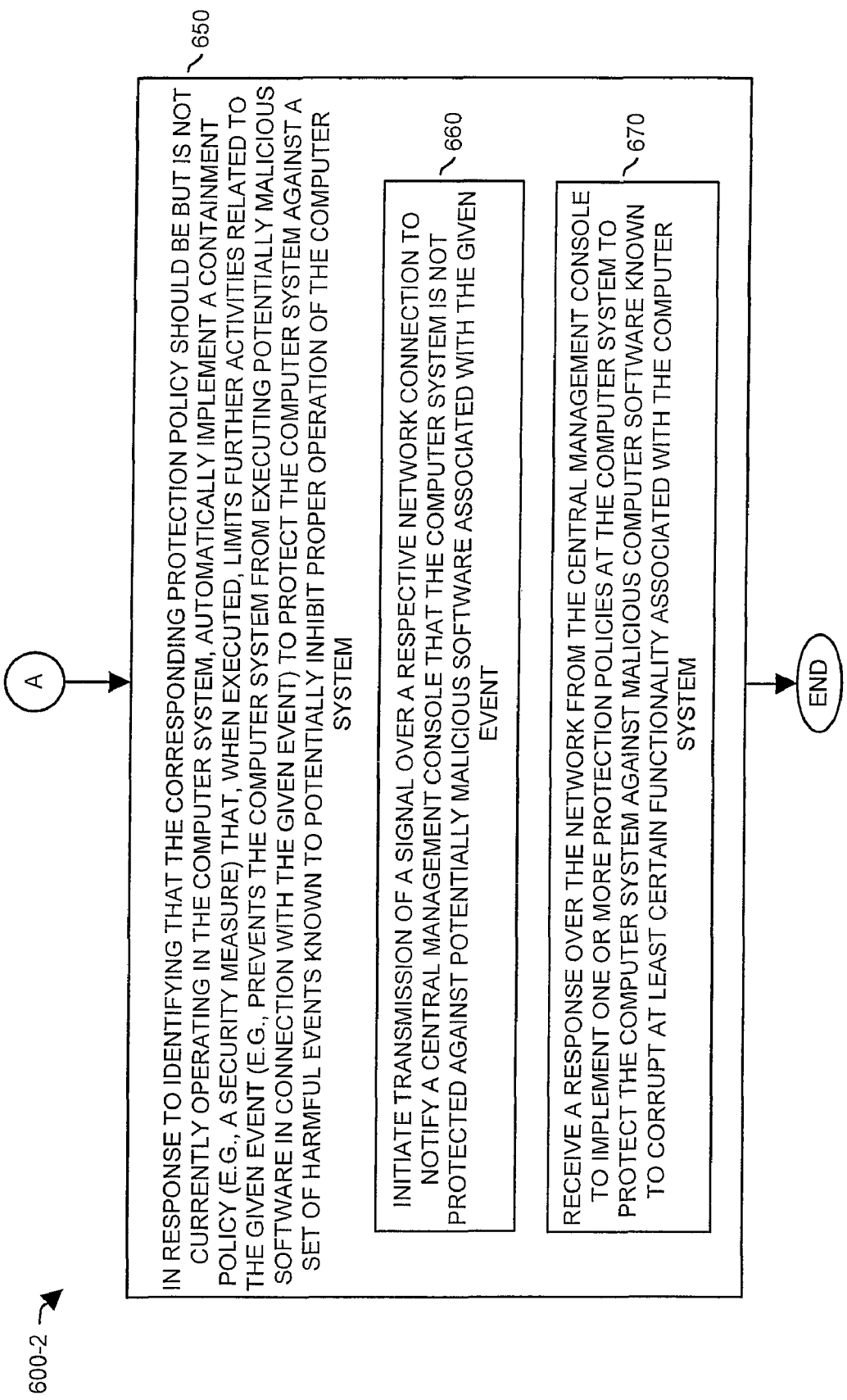

FIGS. 6 and 7 combine to form a flowchart 600 (e.g., flowchart 600-1 and flowchart 600-2) illustrating example processing steps associated with security application 120-1 according to an embodiment herein. Note that techniques discussed in flowchart 600 overlap with the techniques discussed above in the previous figures.

In step 610, the security application 120-1 initiates execution of an audit policy 142 and a corresponding set of one or more rules that, when executed in the computer system 110-1, selectively provide notification of which of multiple types of protection policies 144 should be currently activated in the computer system 110-1 to protect the computer system 110-1 against known (and/or potentially unknown) computer attacking software in response to detecting behavior (e.g., activities, events, etc.) in the computer system 110-1 that are potentially indicative of a presence of known computer attacking software or the need for protection.

In step 620, the security application 120-1 initiates execution of an audit rule associated with a detected event to provide notification that a corresponding protection policy associated with the detected event should be currently operating in the computer environment 100 to protect the computer system 110-1.

In step 630, the security application 120-1 evaluates whether the corresponding protection policy 144 is currently operating to protect the computer system 110-1.

In sub-step 640 associated with step 630, the security application 120-1 accesses a repository of information (e.g., status information 150) to identify whether the corresponding protection policy, if currently operating to protect the computer system, has initiated execution of a rule that modifies contents of the repository to provide notification that the corresponding protection policy is currently operating to protect the computer system 110-1.

In step 650, in response to identifying that the corresponding protection policy should be but is not currently operating in the computer system 110-1, the security application 120-1 automatically implements a containment policy (e.g., a security measure specified by remediation policy 160) that, when executed, limits further activities related to the detected event. Immediate execution of the containment policy prevents the computer system 110-1 from executing potentially malicious software in connection with the detected event. In other words, the containment policy protects the computer system against a set of harmful events known to potentially inhibit proper operation of the computer system 110-1.

In sub-step 660 associated with step 650, the security application 120-1 (or other communication process in computer system 110-1) initiates transmission of a signal (e.g., a notification message) over network 190 to notify a central management console (e.g., central manager 199). The message indicates that the computer system 110-1 is not protected (but should be protected) against potentially malicious software associated with the detected event.

In sub-step 670 associated with step 650, the security application 120-1 receives a response over the network 190 from the central manager 199 (e.g., central management console operated by a computer administrator) to implement one or more protection policies at the computer system 110-1 in order to protect the computer system 110-1 against malicious computer software known to corrupt at least certain types of computer functionality.

As discussed above, techniques herein are well suited for use in applications such as those that support protection validation. However, it should be noted that configurations herein are not limited to such use and thus configurations herein and deviations thereof are well suited for use in other environments as well.

In conclusion, embodiments herein can address the problem of possible improper configuration of protection polices for an enterprise security products. Such concepts of the present disclosure can be broadly applied to any product that happens to apply security policies in a modular fashion. The Cisco Security Agent (e.g., CSA) is one such system. It potentially ships with over 100 task or protection specific policy modules (typically containing 5-30 ACL rules each). As discussed above, not all policies are applied in each computer system 110 because they are not necessarily needed.

CSA forces the administrator to select and attach the appropriate subset of modules to groups of desktops and servers based upon the function of the machine and desired protection. This requires the administrator to know what software (requiring protection) is running throughout the organization and where it is running. In a deployment of 50K-100K agents, where end users are allowed to install different types of software, this is a problem because the end users will not necessarily implement the appropriate protection policies for newly installed software.

Embodiments herein including selective encoding of behavioral markers (or flags) (e.g., status information 150) in the policies deployed to an agent. These markers have the advantage of actually being encoded (or residing) within these modular policies. The agent can use a marker to detect the execution of behavior (i.e. an application making a request to access a resource, e.g. such as accepting a connection on TCP/80), which needs to be protected. The local agent can then determine if the necessary security policy module is in effect on this agent. The detection of an unprotected resource can result in an auditing event being sent to the master controller as well as an immediate change/tightening in the security locally in effect on the agent. In the above example, CSA could detect an agent acting as web server, which is not running the web server security policy.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

The invention claimed is:

1. A non-transitory computer-readable medium carrying one or more sequences of instructions for providing security to a computer system, which instructions, when executed by one or more processors, cause the one or more processors to perform:
    monitoring occurrence of events associated with the computer system;
    in response to detecting occurrence of a given event in the computer system, initiating execution of an audit rule associated with the given event to provide notification that a corresponding protection policy associated with the given event should be currently operating to protect the computer system;
    evaluating whether the corresponding protection policy is currently operating in the computer system;
    in response to identifying that the corresponding protection policy should be but is not currently operating in the computer system, initiating application of a security measure to protect the computer system;
    wherein the monitoring includes initiating execution of an audit policy and a corresponding set of rules in the computer system that, when executed in the computer system, selectively provide notification of which of multiple types of protection policies should be currently activated in the computer system to protect the computer system against known computer attacking software in response to detecting activities in the computer system that are indicative of the known computer attacking software.

2. The non-transitory computer-readable medium as in claim 1, further comprising instructions for performing:
    accessing a repository of information to identify whether the corresponding protection policy, if currently operating to protect the computer system, has initiated execution of a rule that modifies contents of the repository to provide notification that the corresponding protection policy is currently operating to protect the computer system.

3. The non-transitory computer-readable medium as in claim 1, further comprising instructions for performing initiating activation of the corresponding protection policy, if not already activated, to protect the computer system against a set of harmful events known to inhibit proper operation of the computer system.

4. The non-transitory computer-readable medium as in claim 1 further comprising instructions which, when executed by the one or more processors, cause the one or more processors to perform:

initiating execution of a first type of protection policy to protect the computer system against a respective set of computer attacking software known to attack a first type of computer functionality associated with the computer system;

initiating execution of a second type of protection policy to protect the computer system against a respective set of computer attacking software known to attack a second type of computer functionality associated with the computer system;

wherein initiating application of the security measure to protect the computer system includes initiating execution of a third type of protection policy to protect the computer system against a respective set of computer attacking software known to attack a third type of computer functionality associated with the computer system.

5. The non-transitory computer-readable medium as in claim 1, further comprising instructions for performing monitoring respective actions associated with the computer system.

6. The non-transitory computer-readable medium as in claim 1, further comprising instructions for performing monitoring access to respective resources associated with the computer system.

7. The non-transitory computer-readable medium as in claim 1, further comprising instructions for performing automatically implementing a containment policy to limit further activities related to the given event.

8. The non-transitory computer-readable medium as in claim 1, further comprising instructions for performing automatically implementing a containment policy that, when executed, prevents the computer system from executing potentially malicious software in connection with the given event.

9. The non-transitory computer-readable medium as in claim 1, further comprising instructions for performing initiating transmission of a signal over a respective network connection to notify a central management console that the computer system is not protected against executing potentially malicious software in connection with the given event.

10. The non-transitory computer-readable medium as in claim 9 further comprising instructions which, when executed by the one or more processors, cause the one or more processors to perform:

receiving a response over the network from the central management console to implement the corresponding protection policy at the computer system to protect the computer system against malicious computer software known to corrupt at least certain functionality associated with the computer system.

11. The non-transitory computer-readable medium as in claim 1, further comprising instructions to cause the initiating operation of the audit rule to i) occur in response to detecting pre-defined behavior associated with the computer system and ii) result in setting a flag indicating a resource type associated with the given event that should be protected in the computer system.

12. The non-transitory computer-readable medium as in claim 11 further comprising instructions which, when executed by the one or more processors, cause the one or more processors to perform:

after evaluating whether the corresponding protection policy is currently operating in the computer system to protect the resource type associated with the given event, resetting the flag;

repeating said setting the flag, evaluating a current protection policy implemented in the computer system, and resetting the flag for future detected events to ensure real-time protection of resources in the computer system.

13. A non-transitory computer-readable medium carrying one or more sequences of instructions, which, when executed by one or more processors, cause the one or more processors to perform:

based on a real-time detection of specific behavior in a computer system that should be protected against a possible presence of known computer attacking software, initiate execution of an audit policy rule that, when executed in the computer system, provides notification that a particular type of protection policy of multiple types of protection policies should be currently activated in the computer system to protect the computer system;

accessing a repository of information to identify and evaluate whether the particular protection policy is currently protecting the computer system;

in response to identifying that the corresponding protection policy should be but is not currently protecting the computer system, automatically implementing a security measure that, when executed, at least temporarily limits further activities associated with the computer system to protect the computer system from the known computer attacking software.

14. The non-transitory computer-readable medium as in claim 13 further comprising instructions which, when executed by the one or more processors, cause the one or more processors to perform:

initiating transmission of a signal over a respective network connection to notify a central management console that the behavior associated with the computer system warrants that the computer system be protected against the possible presence of the known computer attacking software.

15. The non-transitory computer-readable medium as in claim 13 further comprising instructions which, when executed by the one or more processors, cause the one or more processors to perform:

receiving a response over a network from a protection policy management source to implement the particular type of protection policy in the computer system to protect the computer system against the known computer attacking software.

* * * * *